United States Patent
Fukatsu et al.

(10) Patent No.: US 7,021,093 B2
(45) Date of Patent: Apr. 4, 2006

(54) ANTITHEFT DEVICE FOR VEHICLE

(75) Inventors: Tomohiro Fukatsu, Aichi-ken (JP); Masanari Okuno, Aichi-ken (JP); Noriyuki Suzuki, Aichi-ken (JP); Shozo Kito, Aichi-ken (JP)

(73) Assignee: Kabushiki Kaisha Tokai Rika Denki Seisakusho, Aichi-ken (JP)

( * ) Notice: Subject to any disclaimer, the term of this patent is extended or adjusted under 35 U.S.C. 154(b) by 126 days.

(21) Appl. No.: 10/765,838

(22) Filed: Jan. 29, 2004

(65) Prior Publication Data

US 2004/0182121 A1    Sep. 23, 2004

(30) Foreign Application Priority Data

Jan. 31, 2003   (JP) .............................. 2003-024682

(51) Int. Cl.
    *B60R 25/02* (2006.01)
(52) U.S. Cl. ........................................... 70/186
(58) Field of Classification Search .......... 70/182–186, 70/252, 280–282; 292/142, 144
    See application file for complete search history.

(56) References Cited

U.S. PATENT DOCUMENTS

| | | | |
|---|---|---|---|
| 6,543,262 B1* | 4/2003 | Limburg et al. | 70/186 |
| 6,675,673 B1* | 1/2004 | Starken | 74/527 |
| 2002/0116962 A1* | 8/2002 | Zillmann | 70/186 |
| 2004/0050120 A1* | 3/2004 | Hayashi et al. | 70/186 |
| 2004/0069027 A1* | 4/2004 | Fukushima | 70/186 |
| 2004/0074266 A1* | 4/2004 | Zillmann | 70/186 |
| 2004/0107750 A1* | 6/2004 | Fukushima | 70/186 |
| 2005/0138977 A1* | 6/2005 | Suzuki et al. | 70/186 |

FOREIGN PATENT DOCUMENTS

JP    10-138872    5/1998

* cited by examiner

*Primary Examiner*—Lloyd A. Gall
(74) *Attorney, Agent, or Firm*—Nixon Peabody LLP

(57) ABSTRACT

An antitheft system for a vehicle has an electrically-driven steering lock device. In the lock device, due to a lock arm, which is formed integrally with a helical gear, being driven to rotate by a motor, a lock stopper and a lock bar are moved toward a steering shaft and are set in a locked state. Usually, locking is released by the lock stopper and the lock bar being moved toward a side opposite the steering shaft due to elastic urging force of a spring. In a case in which the lock bar catches on an engagement groove and the lock stopper cannot be moved only by the urging force of the spring, a cam, which is rotated integrally with the helical gear, pushes the lock stopper upward such that locking is released.

20 Claims, 6 Drawing Sheets

F I G. 2
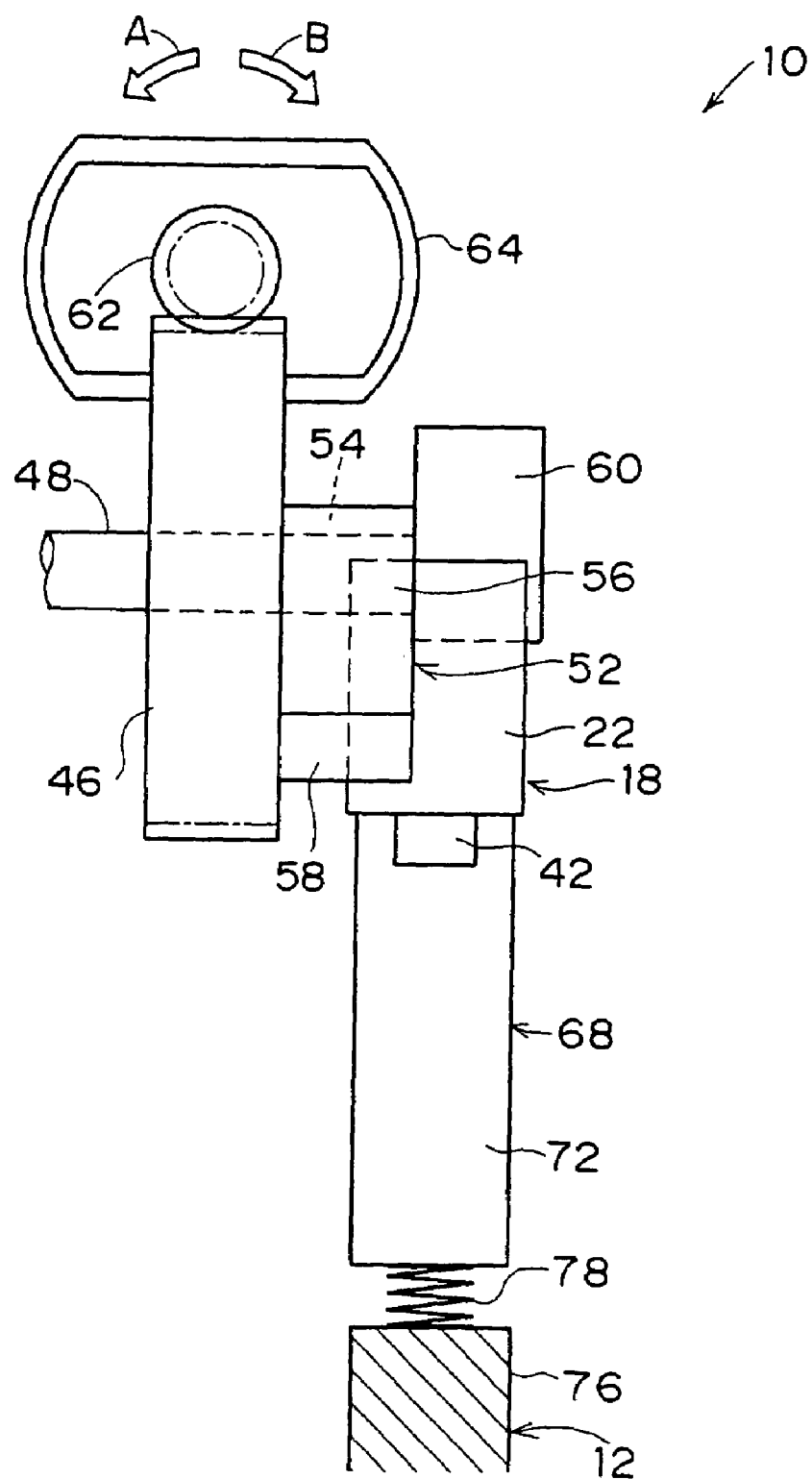

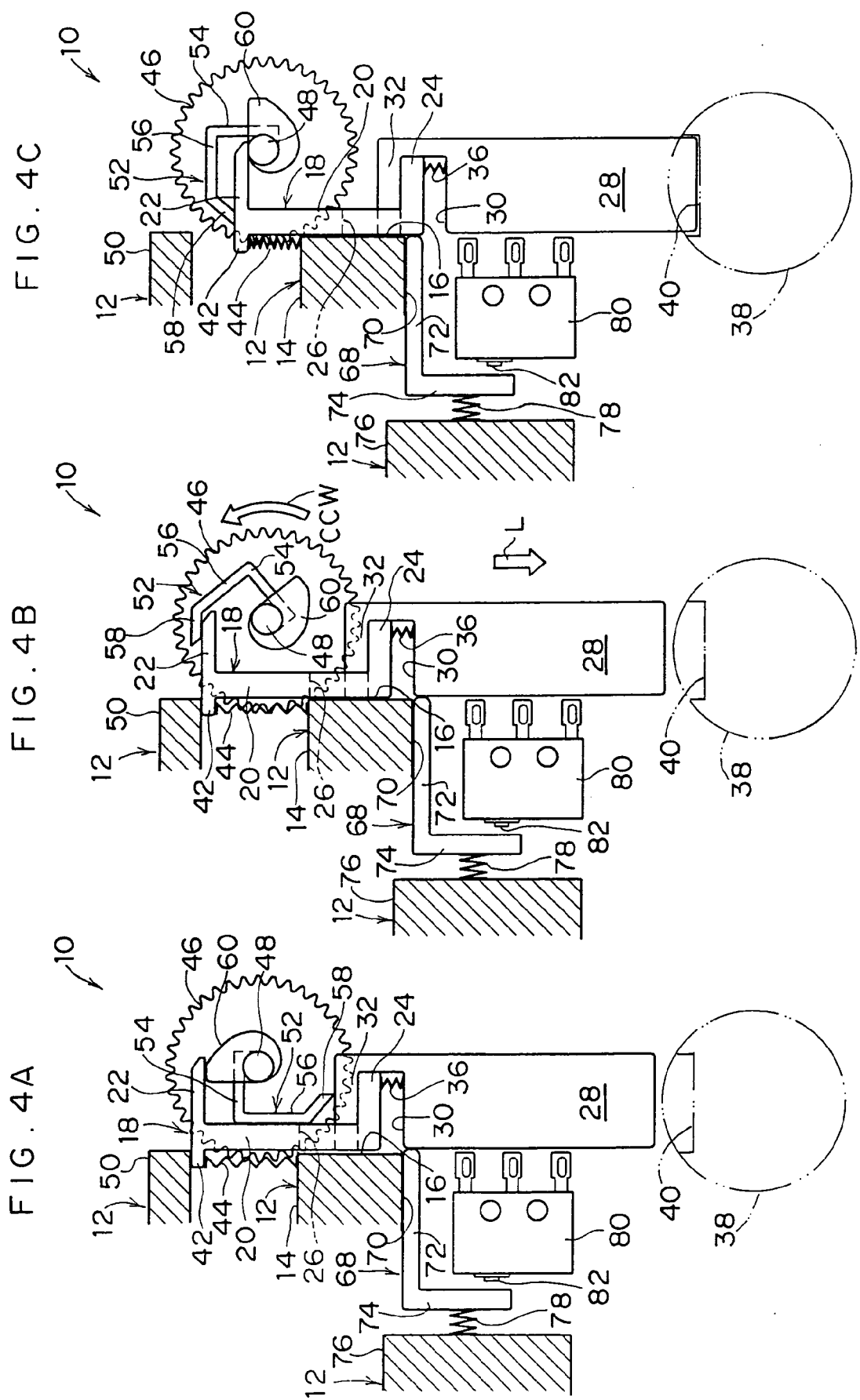

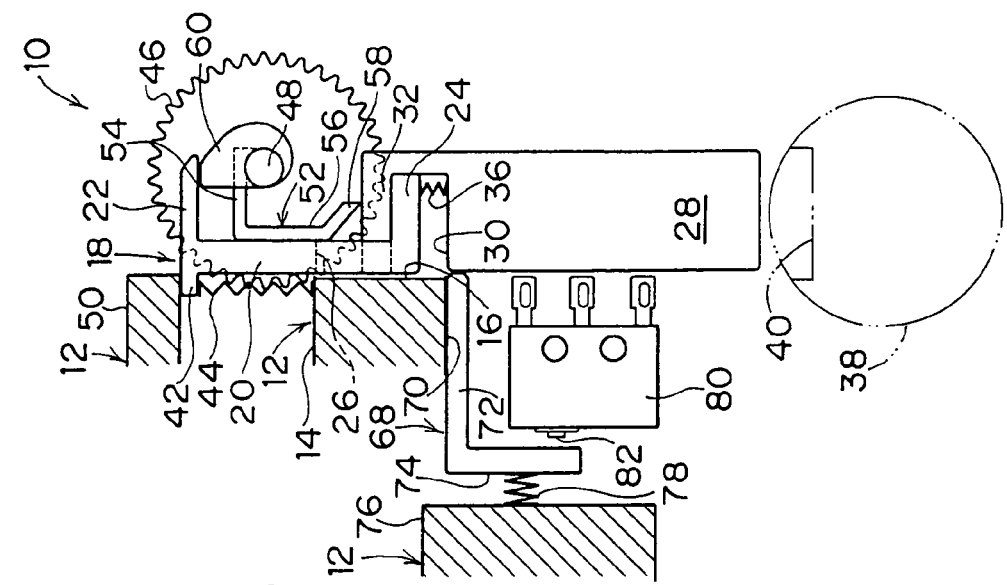
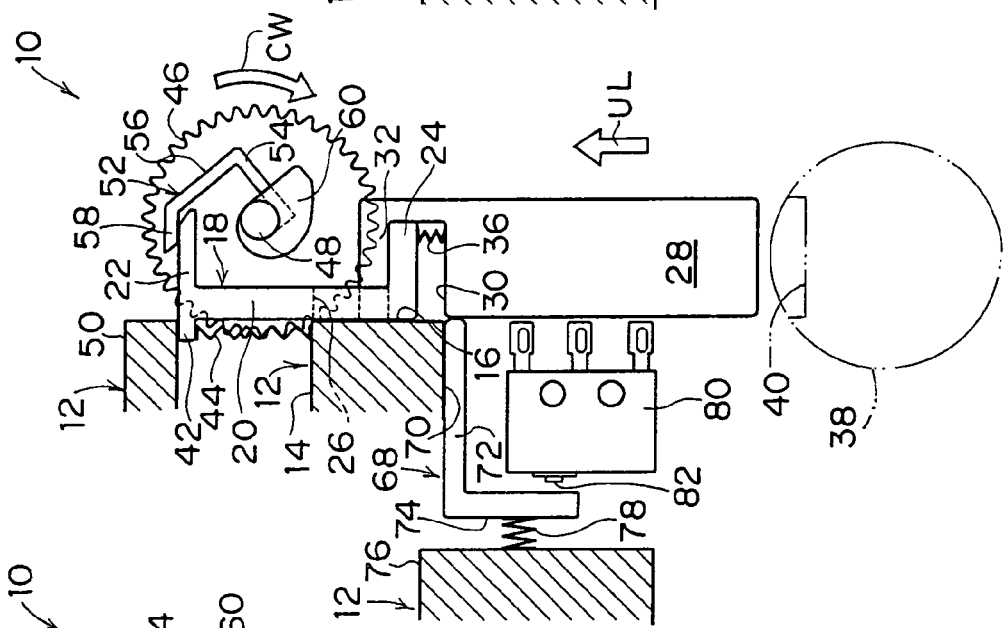
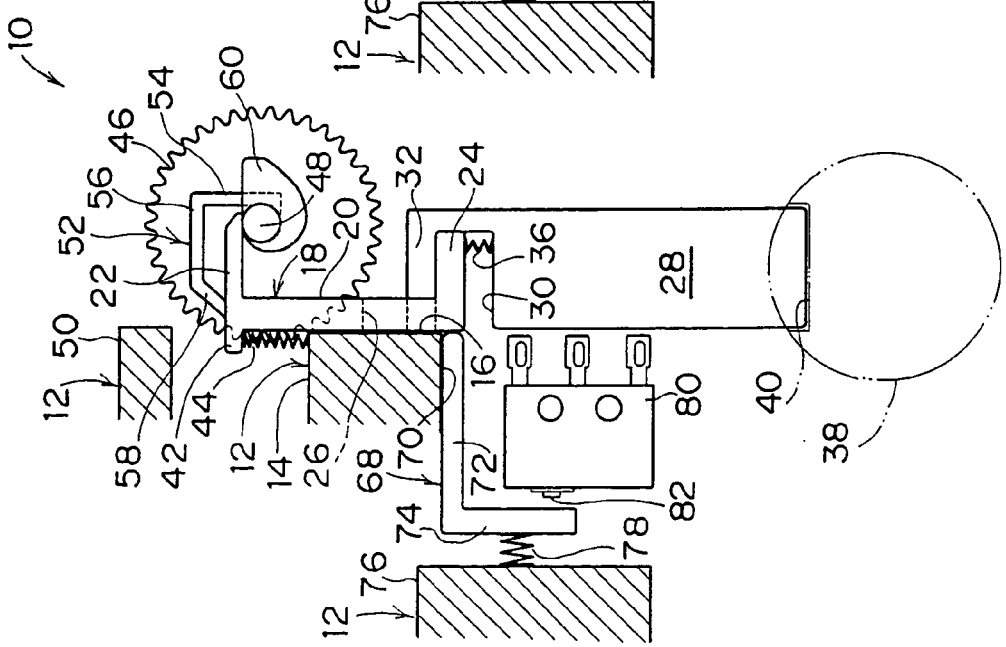

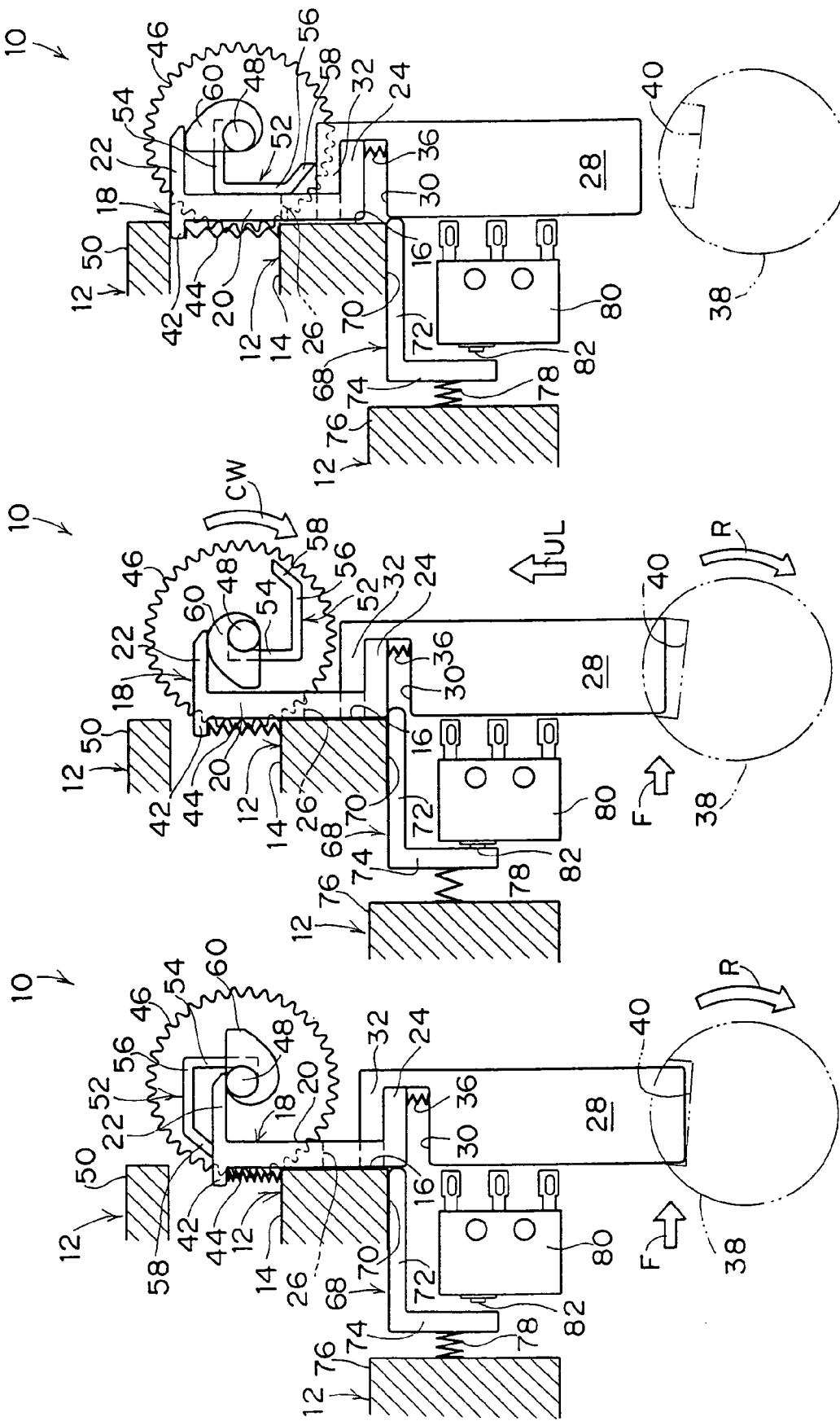

ANTITHEFT DEVICE FOR VEHICLE

CROSS-REFERENCE TO RELATED APPLICATION

This application claims priority under 35 USC 119 from Japanese Patent Application No. 2003-24682, the disclosure of which is incorporated by reference herein.

BACKGROUND OF THE INVENTION

1. Field of the Invention

The present invention relates to an electrically-driven steering shaft lock device which is applied to a vehicle such as an automobile.

2. Description of the Related Art

Vehicles such as automobiles and the like are equipped with, for example, a so-called electrically-driven steering lock device as an antitheft device. The electrically-driven steering lock device has, for example, a lock body which is assembled to the steering post of the vehicle. A lock bar, which is urged toward the steering shaft by a spring, is provided within the lock body. By making the lock bar protrude out toward the steering shaft and engage with an engagement groove formed in the steering shaft, the steering shaft is locked.

A screw mechanism or a cam mechanism or a reciprocatingly-movable driving body is driven by an electrically-driven motor which is the means for driving the lock bar, and the lock bar, which is engaged with the steering shaft, is pulled out such that the locking is released. See, for example, Japanese Patent Application (JP-A) No. 10-138872.

There are cases in which, in the state in which the lock bar is engaged with the engagement groove of the steering shaft, force in a rotating direction is applied to the steering shaft by the repulsion from the wheel, and lock bar catches on the engagement groove of the steering shaft, and resistance to pulling-out of the lock bar arises. Accordingly, the means for driving the lock bar must have driving force which is sufficient to pull the lock bar out against such resistance.

Here, when a screw mechanism is used as the driving means, a large driving force is obtained, and the device itself can be made compact. On the other hand, there are problems in that, not only does the cost increase, but also, the operation time for pulling out the lock bar is long.

When a cam mechanism is used as the driving means, the cost is lower as compared with a screw mechanism, but the efficiency of converting from rotational motion to rectilinear motion is poor, and the driving force is weak. Therefore, either the motor must be made larger and the output increased, or the gear reduction ratio must be increased, or the like. Therefore, problems arise in that the electrically-driving steering lock device itself becomes large and the cost thereof increases.

SUMMARY OF THE INVENTION

In view of the aforementioned, an object of the present invention is to provide an electrically-driven steering lock device which provides sufficient force for pulling a lock bar out, and which is compact and low-cost.

In order to achieve the above object, an electrically-driven steering lock device has a lock stopper, a lock bar, an urging device, a gear, a lock arm, and a cam. The lock stopper is able to move toward a steering shaft. The lock bar is connected to the lock stopper and is able to move integrally with the lock stopper. In a state in which the lock stopper has been moved toward the steering shaft, the lock bar projects toward the steering shaft and engages with an engagement groove of the steering shaft and locks the steering shaft. In a state in which the lock stopper has been moved toward a side opposite the steering shaft, the lock bar moves toward the side opposite the steering shaft and releases locking. The urging device urges the lock stopper toward the side opposite the steering shaft. The gear is a portion which is driven to rotate by driving force from a drive source. The lock arm provided so as to be interlocked with the gear and so as to be engageable with the lock stopper, and due to forward rotation of the gear, the lock arm moves the lock stopper toward the steering shaft and holds the lock stopper. The cam is provided so as to be interlocked with the gear and so as to be engageable with the lock stopper, and due to reverse rotation of the gear, the cam moves the lock stopper toward the side opposite the steering shaft and holds the lock stopper.

In the electrically-driven steering lock device of the present invention, the lock stopper can move toward the steering shaft. In the state in which the lock stopper has been moved, by the urging device and the cam, toward the side opposite to the steering shaft and is held, the lock bar, which is connected to the lock stopper and which can move integrally with the lock stopper, moves toward the side opposite the steering shaft and releases locking of the steering shaft.

In this state in which locking is released, when the gear rotates forward due to the driving force from the drive source, the cam and the lock arm, interlockingly with the gear, also rotate forward and move. Therefore, the holding of the lock stopper by the cam is released, and the lock stopper becomes able to move. Then, the lock arm engages with the lock stopper, and, against the urging force of the urging device, moves the lock stopper toward the steering shaft and holds the lock stopper. In this way, the lock bar, which is connected to the lock stopper, projects toward the steering shaft and engages with the engagement groove, such that the steering shaft is locked.

In this locked state, when the gear rotates reversely due to the driving force from the drive source, the lock arm and the cam, interlockingly with the gear, also rotate reversely and move. Therefore, the lock stopper, which has been moved toward the steering shaft and is held by the lock arm, moves, due to the urging force of the urging device, in the direction opposite the steering shaft, and is held by the cam which has, interlockingly with the gear, rotated reversely and moved. In this way, the lock bar, which is connected to the lock stopper, is moved toward the side opposite the steering shaft, and the locking of the steering shaft is released.

In this way, usually, the lock stopper is moved in the direction opposite the steering shaft by only the urging force of the urging device, and the locking is released. Therefore, the releasing of the locking can be carried out in a short period of time.

However, there are cases in which, in the above-described locked state, force in the direction of rotation is applied to the steering shaft due to the repulsion from the wheels, and the lock bar catches on the engagement groove of the steering shaft, and it is difficult for the lock stopper to move only by the urging force of the urging device.

In such cases, the lock stopper is moved toward the side opposite the steering shaft and held by the cam which rotates interlocking with the gear due to the driving force of from the drive source. Further, at this time, the urging device also assists in moving the lock stopper. Namely, in a case in which there is resistance to the movement of the lock bar, the lock stopper is moved by both the cam and the urging device, the lock bar is pulled-out from the engagement groove of the steering shaft. Accordingly, as compared with a case in which the lock stopper is moved only by a cam, the burden on the drive source can be lessened. Therefore, the drive source can be made to be inexpensive and compact.

Further, in a state in which the lock stopper is moved toward the side opposite the steering shaft and locking is released, the lock stopper is held by both the cam and the urging device. Therefore, it is possible to reliably prevent the steering shaft from locking at unnecessary times such as while the vehicle is traveling or the like.

In this way, in the electrically-driven steering lock device of the present invention, it is possible to provide a force which is sufficient for pulling a lock bar out, and the steering lock device can be made to be compact and inexpensive. It is possible to provide an antitheft system for a vehicle and a module for a steering system which include this electrically-driven steering lock device.

BRIEF DESCRIPTION OF THE DRAWINGS

FIG. 2 is a top view showing the structure of main portions of the electrically-driven steering lock device relating to the embodiment of the present invention.

FIG. 4A is a front view showing a state in which locking is released, in the steps of operation of the electrically-driven steering lock device relating to the embodiment of the present invention.

FIG. 4B is a front view showing a step in which a gear is rotated and a lock bar is moved by a lock arm, in the electrically-driven steering lock device relating to the embodiment of the present invention.

FIG. 4C is a front view showing a locked state in the steps of operation of the electrically-driven steering lock device relating to the embodiment of the present invention.

FIG. 5A is a front view showing a locked state in the steps of operation of the electrically-driven steering lock device relating to the embodiment of the present invention.

FIG. 5B is a front view showing a step in which the gear is rotated and the lock bar is moved by an urging device, in the electrically-driven steering lock device relating to the embodiment of the present invention.

FIG. 5C is a front view showing a state in which locking is released, in the electrically-driven steering lock device relating to the embodiment of the present invention.

FIG. 6A is a front view showing a state in which force in a direction of rotation is applied to a steering shaft in a locked state, in the steps of operation of the electrically-driven steering lock device relating to the embodiment of the present invention.

FIG. 6B is a front view showing a state in which the gear is rotated and the lock bar is moved by a cam, in the electrically-driven steering lock device relating to the embodiment of the present invention.

FIG. 6C is a front view showing a state in which locking is released, in the electrically-driven steering lock device relating to the embodiment of the present invention.

DETAILED DESCRIPTION OF THE INVENTION

Figure 1:
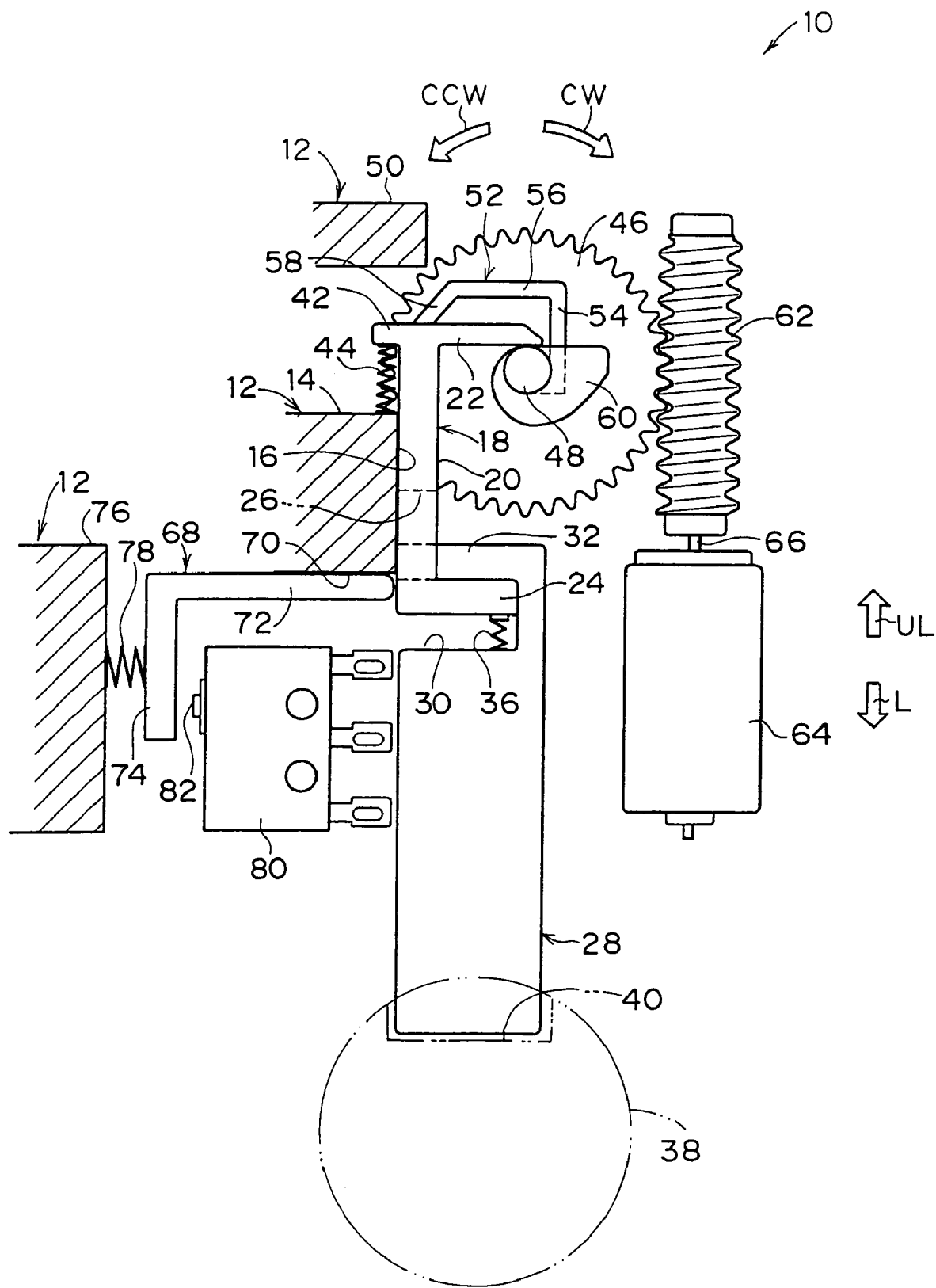
FIG. 1 is a front view showing the structure of main portions of an electrically-driven steering lock device relating to an embodiment of the present invention.

FIG. 1 illustrates, as a front view, the structure of main portions of an electrically-driven steering lock device 10 relating to an embodiment of the present invention.

The electrically-driven steering lock device 10 has a lock body 12 which is box-shaped or parallelepiped, and which is mounted to the steering post (not illustrated) of a vehicle. A block-shaped projecting portion 14 projects at the interior of the lock body 12. A lock stopper 18 is provided so as to abut a slide surface 16 of the projecting portion 14.

The lock stopper 18 has a plate-shaped slide portion 20. A plate-shaped engaging portion 22 projects, in the direction of plate thickness of the slide portion 20, at one end portion of the slide portion 20 (i.e., at the upper end portion of the slide portion 20 in FIG. 1) at the side opposite the projecting portion 14. In the same way as the engaging portion 22, a plate-shaped connecting portion 24 projects, in the direction of plate thickness of the slide portion 20, at the end portion of the slide portion 20 at the side opposite the engaging portion 22. A through hole 26 is formed in the slide portion 20 from the attached root portion of the connecting portion 24 to the longitudinal direction intermediate portion of the slide portion 20.

The lock stopper 18 can move along the slide wall 16 in the direction of arrow L and in the direction of arrow UL in FIG. 1, due to the slide portion 20 sliding along the slide wall 16 of the projecting portion 14.

A rectangular-rod-shaped lock bar 28 is provided at the connecting portion 24 side of the lock stopper 18. A groove portion 30 is formed in the lock stopper 18 side of the lock bar 28, in correspondence with the connecting portion 24 of the lock stopper 18. The lock stopper 18 and the lock bar 28 are connected by the connecting portion 24 engaging with the groove portion 30. At this time, the distal end of a proximal end 32 of the lock bar 28 is fit into the through hole 26 of the lock stopper 18.

The groove width of the groove portion 30 is formed so as to be wider than plate thickness of the connecting portion 24. A spring 36 is disposed between the connecting portion 24 and the groove portion 30. Due to the spring 36, the lock stopper 18 and the lock bar 28 are urged in directions of moving apart from one another, and the lock stopper 18 and the lock bar 28 are connected so as to be integrally movable.

The distal end portion of the lock bar 28 is disposed so as to face a steering shaft 38, and so as to be able to engage with an engagement groove 40 of the steering shaft 38. Due to the lock bar 28 engaging with the engagement groove 40, the steering shaft 38 is locked so as to be unable to rotate (the state shown in FIG. 1).

A projection-shaped projecting piece 42 projects at the lock stopper 18 at the side opposite the side where the engaging portion 22 projects. A spring 44, which is a member included in an urging device, is provided between the projecting piece 42 and the projecting portion 14 of the lock body 12. The spring 44 elastically urges the lock stopper 18 toward the side opposite the steering shaft 38. As an urging means, examples are not limited to the spring 44 as far as the examples similarly achieve the urging function as the spring 44.

A helical gear 46, which is a gear, is provided at the engaging portion 22 side of the lock stopper 18 in the widthwise direction of the lock stopper 18 (in the upward direction in FIG. 2). A shaft 48 is press-fit in and passes through the center of the helical gear 46. Although not illustrated, due to the shaft 48 being rotatably held at the lock body 12, the helical gear 46 is able to rotate relative to the lock body 12. Moreover, as shown in FIG. 2, the shaft 48 is disposed at the position of the distal end of the engaging portion 22 of the lock stopper 18. Movement of the lock stopper 18 is restricted to between the shaft 48 and an upper portion 50 of the lock body 12.

A lock arm 52 projects from the lock stopper 18 side of the helical gear 46. As shown in FIG. 1, the lock arm 52 is formed in the shape of a plate whose both end portions are folded over toward the same side. The lock arm 52 projects such that the widthwise direction thereof is a direction coinciding with the direction of thickness of the helical gear 46.

The lock arm 52 is structured by a proximal end portion 54, an intermediate portion 56, and a distal end portion 58. The proximal end portion 54 is provided from the side of the shaft 48 to the radial direction intermediate portion of the helical gear 46. The intermediate portion 56 projects from one end of the proximal portion 54 (the upper end portion in FIG. 1) at the shaft 38 side and in a direction orthogonal to the proximal end portion 54, and is provided up to a vicinity of the gear portion at the outer periphery of the helical gear 46. The distal end portion 58 projects from one end of the intermediate portion 56 (the left end portion in FIG. 1), at a downward and leftward incline. The lock arm 52 is formed integrally with the helical gear 46.

A cam 60 is provided at the side of the lock arm 52 opposite the side at which the helical gear 46 is disposed. The cam 60 is formed integrally with the helical gear 46 and the lock arm 52, with the central axis of the shaft 48 being the center of rotation of the cam 60. The cam 60 projects eccentrically in the direction opposite to the direction in which the intermediate portion 56 of the lock arm 52 projects.

Figure 3:
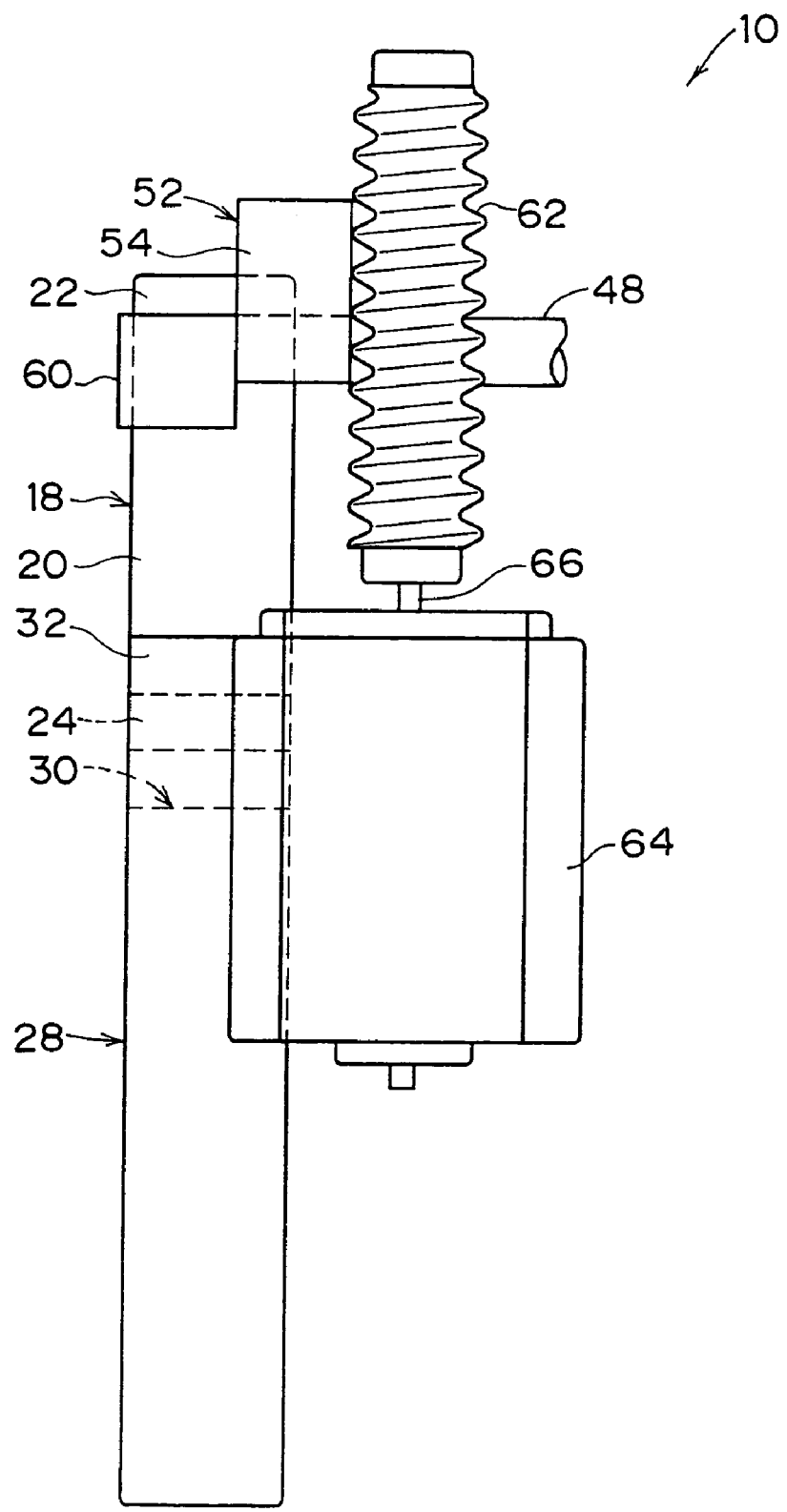
FIG. 3 is a side view showing the structure of main portions of the electrically-driven steering lock device relating to the embodiment of the present invention.

As shown in FIGS. 2 and 3, the lock stopper 18 is disposed at a position so as to extend over both the lock arm 52 and the cam 60 in the widthwise direction.

At the side opposite the projecting portion 14 of the lock body 12, the helical gear 46 engages with a worm gear 62. A rotating shaft 66 of a motor 64, which is a drive source, is press-fit into the worm gear 62, such that the worm gear 62 rotates integrally with the rotating shaft 66. Electric power is supplied to the motor 64 via an unillustrated wire disposed at the interior of the lock body 12, such that the rotating shaft 66 is rotated forward and reversely by an unillustrated control circuit installed in the vehicle. The rotating shaft 66 is rotated in the direction of arrow A and in the direction of arrow B in FIG. 2.

A plate-shaped push part 68, which is formed in an L-shape, is provided at the side of the lock bar 28 opposite the side at which the motor 64 is provided. The push part 68 has a horizontal portion 72 and a vertical portion 74. The horizontal portion 72 slides along a side wall 70 of the projecting portion 14 of the lock body 12. The horizontal portion 72 is able to fit into the groove portion 30 of the lock bar 28. The vertical portion 74 projects vertically downward in FIG. 1 from one end of the horizontal portion 72. A spring 78, which is a member included in the urging device, is provided between the vertical portion 74 and a side wall 76 of the lock body 12. The spring 78 urges the push part 68 toward the lock bar 28.

A microswitch 80 is provided between the lock bar 28 and the vertical portion 74 of the push part 68. A switch portion 82, which opens and closes the contact (not illustrated) of the microswitch 80, is disposed in the direction facing the vertical portion 74 of the push part 68. In accordance with the opening and closing of the contact of the microswitch 80, the control circuit senses the position of the lock bar 28 and controls the rotation of the motor 64.

Here, in the state in which the lock stopper 18 has moved to the side opposite the steering shaft 38 (i.e., in the state shown in FIG. 4A), when the rotating shaft 66 of the motor 64 is rotated counterclockwise (in the direction of arrow A in FIG. 2) by the control circuit, the helical gear 46 is rotated forward in the counterclockwise direction (in the direction of arrow CCW in FIG. 4B). Therefore, the lock arm 52, which is formed integrally with the helical gear 46, also rotates, and the distal end portion 58 of the lock arm 52 engages with the engaging portion 22 of the lock stopper 18 (the state shown in FIG. 4B). Then, due to the lock arm 52 being rotated further, the lock stopper 18 and the lock bar 28 are pushed downward toward the steering shaft 38 (in the direction of arrow L in FIG. 4B).

At this time, when the position of the distal end of the horizontal portion 72 of the push part 68 temporarily coincides with the groove portion 30 of the lock bar 28, the push part 68 moves due to the urging force of the spring 78 such that the distal end of the horizontal portion 72 is temporarily fit-in into the groove portion 30 of the lock bar 18. Therefore, the vertical portion 74 of the push part 68 abuts the switch portion 82 of the microswitch 80, and the contact of the microswitch is turned on. In this way, in the state in which the helical gear 46 has been rotated to the position shown in FIG. 4C, the rotation of the rotating shaft 66 of the motor 64 is stopped by the control circuit, and the lock stopper 18 is held by the lock arm 52 at the steering shaft 38 side. The motor 64 and the worm gear 62 are omitted from illustrated in FIGS. 4A through 4C.

Further, in the state in which the lock stopper 18 has been moved to the steering shaft 38 side (the state shown in FIG. 5A), when the rotating shaft 66 of the motor 64 is rotated clockwise (in the direction of arrow B in FIG. 2) by the control circuit, the helical gear 46 is rotated reversely in the clockwise direction (in the direction of arrow CW in FIG. 5B). Therefore, the lock arm 52 also rotates integrally with the helical gear 46, and the holding of the lock stopper 18 is released. Here, the lock stopper 18 is urged by the spring 44 toward the side opposite the steering shaft 38. Thus, the lock stopper 18 and the lock bar 28 are moved, by the urging force of the spring 44, toward the side opposite the steering shaft 38 (in the direction of arrow UL in FIG. 5B), and the contact of the microswitch 80 is turned on by the push part 68.

In this way, in the state in which the helical gear 46 has been rotated to the position shown in FIG. 5C, the rotation of the rotating shaft 66 of the motor 64 is stopped by the control circuit, and the lock stopper 18 is held at the side opposite the steering shaft 38 by the spring 44 and the cam 60. The motor 64 and the worm gear 62 are omitted from illustration in FIGS. 5A through 5C.

On the other hand, in the state in which the lock stopper 18 has been moved toward the steering shaft 38, there is resistance to the movement of the lock bar 28, and there are cases in which it is difficult for the lock stopper 18 to be moved only by the urging force of the spring 44. In such cases, as shown in FIGS. 6A through 6C, due to the rotational movement of the cam 60 which is formed integrally with the helical gear 46 and the lock arm 52, the lock stopper 18 is pushed upward toward the side opposite the steering shaft 38. (The motor 64 and the worm gear 62 are omitted from illustration in FIGS. 6A through 6C.)

Next, operation of the embodiment of the present invention will be described.

In the electrically-driven steering lock device 10 having the above-described structure, the lock stopper 18 is movable in the direction of arrow L and in the direction of arrow UL in FIG. 1 (i.e., in a direction orthogonal to the central axis of the steering shaft 38). In the state in which the lock stopper 18 is moved to and held at the side opposite the steering shaft 38 (i.e., in the direction of arrow UL in FIG. 1) by the spring 44 and the cam 60, the lock bar 28, which is connected to the connecting portion 24 of the lock stopper 18 and which can move integrally with the lock stopper 18, is moved toward the side opposite the steering shaft 38 such that locking of the steering shaft 38 is released (the state shown in FIG. 4A).

In this state in which locking is released, when the rotating shaft 66 of the motor 64 is rotated counterclockwise (in the direction of arrow A in FIG. 2) by the control circuit, the helical gear 46 is rotated counterclockwise (in the direction of arrow CCW in FIG. 4B) via the worm gear 62. Therefore, the cam 60 and the lock arm 52, which are formed integrally with the helical gear 46, also rotate and move in the direction of arrow CCW in FIG. 4B. Accordingly, the holding of the lock stopper 18 by the cam 60 is released, and the lock stopper 18 becomes able to move. Then, the distal end portion 58 of the lock arm 52 engages with the engaging portion 22 of the lock stopper 18 (the state shown in FIG. 4B), and the lock stopper 18 is moved toward the steering shaft 38 (in the direction of arrow L in FIG. 4B) against the urging force of the spring 44.

At this time, due to the distal end of the horizontal portion 72 of the push part 68 being temporarily fit-in into the groove portion 30 of the lock bar 28, the contact of the microswitch 80 is temporarily turned on, and the control circuit senses the movement of the lock bar 18. Therefore, as shown in FIG. 4C, the rotation of the rotating shaft 66 of the motor 64 is stopped by the control circuit at the position where the distal end of the engaging portion 22 of the lock stopper 18 abuts the shaft 48. In this way, the distal end portion of the lock bar 28, which is connected to the connecting portion 24 of the lock stopper 18, projects toward the steering shaft 38 and engages with the engagement groove 40 such that the steering shaft 38 is locked (the state shown in FIG. 4C).

Note that there are cases in which, at the time when the lock bar 28 engages with the steering shaft 38, there is positional offset between the lock bar 28 and the engagement groove 40 of the steering shaft 38, and the distal end of the lock bar 28 abuts the outer periphery of the steering shaft 38 such that movement of the lock bar 28 is restricted. In such cases, due to the spring 36, which is provided between the lock bar 28 and the lock stopper 18, contracting, movement of the lock stopper 18 toward the steering shaft 38 side is not restricted. Then, if the driver rotates the steering wheel such that the positions of the engagement groove 40 and the lock bar 28 coincide with one another, the lock bar 28 engages with the engagement groove 40 due to the urging force of the spring 36, and the steering shaft 38 is locked.

In this locked state (the state shown in FIG. 5A), when the rotating shaft 66 of the motor 64 is rotated clockwise (in the direction of arrow B in FIG. 2) by the control circuit, the helical gear 46 is rotated clockwise (in the direction of arrow CW in FIG. 5B) via the worm gear 62. Thus, the lock arm 52 and the cam 60, which are formed integrally with the helical gear 46, also rotate and move in the direction of arrow CW in FIG. 5B. Accordingly, holding of the lock stopper 18 by the lock arm 52 is released, and the lock stopper 18 moves in the direction opposite the steering shaft 38 (in the direction of arrow UL in FIG. 5B) due to the urging force of the spring 44. Then, movement of the lock stopper 18 is restricted due to the projecting piece 42 abutting the upper portion 50 of the lock body 12.

Moreover, at this time, due to the distal end of the horizontal portion 72 of the push piece 68 being temporarily fit-in into the groove portion 30 of the lock bar 28, the contact of the microswitch 80 is temporarily turned on, and the control circuit senses the movement of the lock bar 18. Therefore, as shown in FIG. 5C, the rotation of the rotating shaft 66 of the motor 64 is stopped by the control circuit at the position where the intermediate portion 56 of the lock arm 52 abuts the slide portion 20 of the lock stopper 18. Then, in this state, the distal end portion of the cam 60, which is eccentric toward the side opposite the lock arm 52, engages with the engaging portion 22 of the lock stopper 18. The movement of the lock stopper 18 toward the steering shaft 38 is thereby restricted. In this way, the distal end portion of the lock bar 28, which is connected to the engaging portion 24 of the lock stopper 18, is moved toward the side opposite the steering shaft 38 such that locking of the steering shaft 38 is released (the state shown in FIG. 5C).

In this way, locking is usually released due to the lock stopper 18 being moved toward the side opposite the steering shaft 38 by only the urging force of the spring 44. Therefore, the releasing of the locking can be carried out in a short period of time.

However, there are cases in which, in the above-described locked state, force in the direction of rotation (the direction of arrow R in FIG. 6A) is applied to the steering shaft 38 as shown in FIG. 6A due to the repulsion from the wheels (not illustrated), and the lock bar 28 receives force in a direction intersecting the moving direction (i.e., receives force in the direction of arrow F in FIG. 6A) from the engagement groove 40 of the steering shaft 38.

In such a state, even if the lock arm 52 is rotated by the driving force from the motor 64 and the holding of the lock stopper 18 by the lock arm 52 is released, there are cases in which the lock stopper 18 is not moved only by the urging force of the spring 44, and the locking cannot be released.

In such cases, as shown in FIG. 6B, the cam 60, which is rotated integrally with the helical gear 46, rotates while pushing the engaging portion 22 of the lock stopper 18 upward. The lock stopper 18 is thereby moved in the direction opposite the steering shaft 38 (i.e., in the direction of arrow UL in FIG. 6B). At this time, the movement of the lock stopper 18 is aided by the urging force of the spring 44 as well. Namely, in a case in which the lock bar 28 catches on the engagement groove 40 of the steering shaft 38 and there is resistance to movement of the lock stopper 18, the lock stopper 18 is moved by both the cam 60 and the spring 44, and the lock bar 28 is pulled out from the engagement groove 40. Accordingly, as compared with a case in which the lock stopper 18 is moved only by the cam 60, the burden on the motor 64 is decreased. Therefore, the motor 64 can be made to be inexpensive and compact.

Further, in the state in which the lock stopper 18 is moved to the side opposite the steering shaft 38 and locking is released, the lock stopper 18 is held by both the cam 60 and the spring 44. Therefore, the steering shaft 38 can be reliably prevented from locking at unnecessary times, such as when the vehicle is traveling of the like.

The driving mechanism of the lock arm 52 and the cam 60 is a one-step decelerating mechanism formed by the worm gear 62 and the helical gear 46. Therefore, the driving mechanism can be made to be simple and the cost thereof reduced.

Because the helical gear 46, the lock arm 52 and the cam 60 can be molded integrally, the cost of the driving mechanism of the lock stopper 18 can be reduced.

Moreover, the locked state and the unlocked state, which arise due to movement of the lock bar 28, are detected by the single microswitch 80. Therefore, the cost can be reduced as compared with a case in which two switches are provided.

In this way, in the electrically-driven steering lock device 10 having the above-described structure, sufficient force for pulling the lock bar 28 out is provided, and the electrically-driven steering lock device 10 can be made to be compact and inexpensive.

Note that, in the above-described embodiment, the helical gear 46 which is a gear is rotated and driven by the driving force of the motor 64 via the worm gear 62. However, the present invention is not limited to the same, and another type of gear such as a spur gear or the like may be driven via a pinion gear or the like. However, in such a case, a mechanism which restricts unnecessary rotation of the motor 64 in the locked state and the unlocked state is also used.

Moreover, in the above-described embodiment, the lock stopper 18 and the lock bar 28 are connected together as separate members. However, the present invention is not limited to the same, and the lock stopper 18 and the lock bar 28 may be formed integrally.

In the above-described embodiment, movement of the push part 68 is permitted due to the push part 68 being fit-in in the groove portion 30 of the lock bar 28. However, the present invention is not limited to the same. The push part, which can move toward the lock stopper 18, may be structured such that movement thereof is permitted due to the push part 68 being fit-in into a groove portion formed in the lock stopper 18.

In addition, the helical gear 46, the lock arm 52, and the cam 60 are formed integrally in the above-described embodiment. However, the present invention is not limited to the same. The lock arm 52 and the cam 60 maybe formed separately from the helical gear 46, and may be rotated interlockingly with the helical gear 46.

As described above, in accordance with the electrically-driven steering lock device of the present invention, sufficient force for pulling a lock bar out is provided, and the electrically-driven steering lock device can be made to be compact and inexpensive.

What is claimed is:

1. An electrically-driven steering lock device comprising:
   a lock stopper able to move so as to approach a steering shaft;
   a lock bar connected to the lock stopper and able to move integrally wit the lock stopper, and in a state in which the lock stopper has been moved toward the steering shaft, the lock bar projects toward the steering shaft and engages with an engagement groove of the steering shaft and locks the steering shaft, and in a state in which the lock stopper has been moved toward a side opposite the steering shaft, the lock bar moves toward the side opposite the steering shaft and releases locking;
   an urging device that urges the lock stopper toward the side opposite the steering shaft such that the lock bar is urged in a disengagement direction with respect to said engagement groove of said steering shaft;
   a gear driven to rotate by driving force from a drive source;
   a lock arm provided so as to be interlocked with the gear and so as to be engageable with the lock stopper, and due to forward rotation of the gear, the lock arm moves the lock stopper toward the steering shaft and holds the lock stopper and due to reverse rotation of the gear, the lock arm disengages the lock stopper such that the urging device urges the lock bar in said disengagement direction; and
   a cam provided so as to be interlocked with the gear and so as to be engageable with the lock stopper, and due to reverse rotation of the gear, the cam moves the lock stopper toward the side opposite the steering shaft to disengage the lock bar from said engagement groove of said steering shaft only when an urging force applied by said urging device is insufficient to disengage said lock bar from said groove.

2. electrically-driven steering lock device of claim 1, further comprising a lock body which is parallelepiped and at which a projecting portion is provided, and the projecting portion has a slide surface, and the lock stopper is provided so as to abut the slide surface.

3. The electrically-driven steering lock device of claim 2, wherein the lock stopper has a slide portion, and a plate-shaped engaging portion is provided so as to project at one end portion of the slide portion, and a plate-shaped connecting portion is provided at another end portion of the slide portion, and a hole is formed from the other end portion of the slide portion to a longitudinal direction intermediate portion of the slide portion.

4. The electrically-driven steering lock device of claim 3, wherein due to the slide portion of the lock stopper sliding along the slide surface of the projecting portion and being movable along the slide surface, the lock stopper can move so as to approach the steering shaft.

5. The electrically-driven steering lock device of claim 3, wherein the lock stopper has a projecting piece which projects toward a side opposite a direction in which the engaging portion projects, and the urging means includes an elastic spring provided between the projecting piece and the projecting portion of the lock body.

6. The electrically-driven steering lock device of claim 3, wherein the lock bar has a groove portion with which the connecting portion of the lock stopper can engage, and when the lock bar is connected to the lock stopper due to the connecting portion engaging with the groove portion, a distal end of a proximal end portion provided at the lock bar is fit-in in the hole of the lock stopper.

7. The electrically-driven steering lock device of claim 1, wherein the lock stopper and the lock bar are formed integrally.

8. A modular antitheft device for a steering system comprising:
   a lock body which is parallelepiped and is attachable to a steering shaft of the steering system, the lock body having a slide surface;
   a lock stopper provided so as to be able to slide while abutting the slide surface;
   a lock bar able to move integrally with the lock stopper, and in a state in which the lock stopper has been moved toward a steering shaft, the lock bar projects toward the steering shaft and engages with the steering shaft and locks the steering shaft, and in a state in which the lock stopper has been moved toward a side opposite the steering shaft, the lock bar moves toward the side opposite the steering shaft and releases locking;
   an urging device elastically urging the lock stopper toward the side opposite the steering shaft such that the lock bar is urged in a disengagement direction with respect to said steering shaft;
   a gear driven to rotate by driving force from a drive source;

a lock arm provided so as to be interlocked with the gear and so as to be engageable with the lock stopper, and due to forward rotation of the gear, the lock arm moves the lock stopper such that the lock stopper approaches the steering shaft, and holds the lock stopper, and due to reverse rotation of the gear, the lock arm disengages said lock stopper such that the urging device urges lock bar in said disengagement direction; and a cam provided so as to be interlocked with the gear and so as to be engageable with the lock stopper, and due to reverse rotation of the gear, after said lock arm disengages said lock stopper, the cam moves the lock stopper such that the lock stopper moves away from the steering shaft, and holds the lock stopper such that the cam disengages the lock bar from the steering shaft if the urging device fails to cause such disengagement.

9. The modular antitheft device of claim 8, wherein the lock body has a projecting portion, and the projecting portion has the slide surface.

10. The modular antitheft device of claim 9, wherein the lock stopper has a slide portion, and a plate-shaped engaging portion is provided so as to project at one end portion of the slide portion, and a plate-shaped connecting portion is provided at another end portion of the slide portion, and a hole is formed from the other end portion of the slide portion to a longitudinal direction intermediate portion of the slide portion.

11. The modular antitheft device of claim 10, wherein, due to the slide portion of the lock stopper sliding along the slide surface of the projecting portion, the lock stopper can move so as to approach the steering shaft.

12. The modular antitheft device of claim 10, wherein the lock stopper has a projecting piece which projects toward a side opposite a direction in which the engaging portion projects, and the urging device includes a spring provided between the projecting piece and the projecting portion of the lock body.

13. The modular antitheft device of claim 10, wherein the lock bar has a groove portion with which the connecting portion of the lock stopper can engage, and when the lock bar is connected to the lock stopper due to the connecting portion engaging with the groove portion, a distal end of a proximal end portion provided at the lock bar is fit-in in the hole of the lock stopper.

14. The modular antitheft device of claim 8, wherein the lock stopper and the lock bar are formed integrally.

15. An antitheft system for a vehicle, comprising:
a lock body which is parallelepiped and is attachable to a steering shaft of the vehicle, the lock body having a slide surface;
a lock stopper provided so as to be able to slide while abutting the slide surface;
a lock bar able to move integrally with the lock stopper, and in a state in which the lock stopper has been moved toward a steering shaft, the lock bar projects toward the steering shaft and engages with the steering shaft and locks the steering shaft, and in a state in which the lock stopper has been moved toward a side opposite the steering shaft, the lock bar moves toward the side opposite the steering shaft and releases locking;
an urging device elastically urging the lock stopper toward the side opposite the steering shaft such that the lock bar is urged in a disengagement direction with respect to said steering shaft;
a gear driven to rotate by driving force from a drive source;
a lock arm provided so as to be interlocked with the gear and so as to be engageable with the lock stopper, and due to forward rotation of the gear, the lock arm moves the lock stopper such that the lock stopper approaches the steering shaft, and holds the lock stopper, and due to reverse rotation of the gear, the urging device urges the lock bar in said disengagement direction; and
a cam provided so as to be interlocked with the gear and so as to be engageable with the lock stopper, and due to reverse rotation of the gear, and after the lock arm disengages said lock stopper, the cam moves the lock stopper such that the lock stopper moves away from the steering shaft, and holds the lock stopper such that the cam disengages the lock bar from the steering shaft if the urging device fails to cause the lock bar to disengage from the steering shaft.

16. The antitheft system of claim 15, wherein the lock body has a projecting portion, and the projecting portion has the slide surface.

17. The antitheft system of claim 16, wherein the lock stopper has a slide portion, and a plate-shaped engaging portion is provided so as to project at one end portion of the slide portion, and a plate-shaped connecting portion is provided at another end portion of the slide portion, and a hole is formed from the other end portion of the slide portion to a longitudinal direction intermediate portion of the slide portion.

18. The antitheft system of claim 17, wherein, due to the slide portion of the lock stopper sliding along the slide surface of the projecting portion, the lock stopper can move so as to approach the steering shaft.

19. The antitheft system of claim 17, wherein the lock stopper has a projecting piece which projects toward a side opposite a direction in which the engaging portion projects, and the urging device includes a spring provided between the projecting piece and the projecting portion of the lock body.

20. The antitheft system of claim 17, wherein the lock bar has a groove portion with which the connecting portion of the lock stopper can engage, and when the lock bar is connected to the lock stopper due to the connecting portion engaging with the groove portion, a distal end of a proximal end portion provided at the lock bar is fit-in in the hole of the lock stopper.

* * * * *